Sept. 18, 1962 J. A. F. GERRARD 3,054,473
SYSTEM FOR RECORDING DATA FOR USE IN SEISMIC SURVEY
Filed Dec. 27, 1957 3 Sheets-Sheet 1
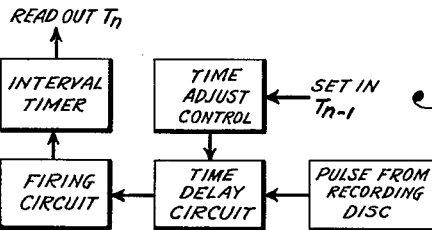
Fig. 1.
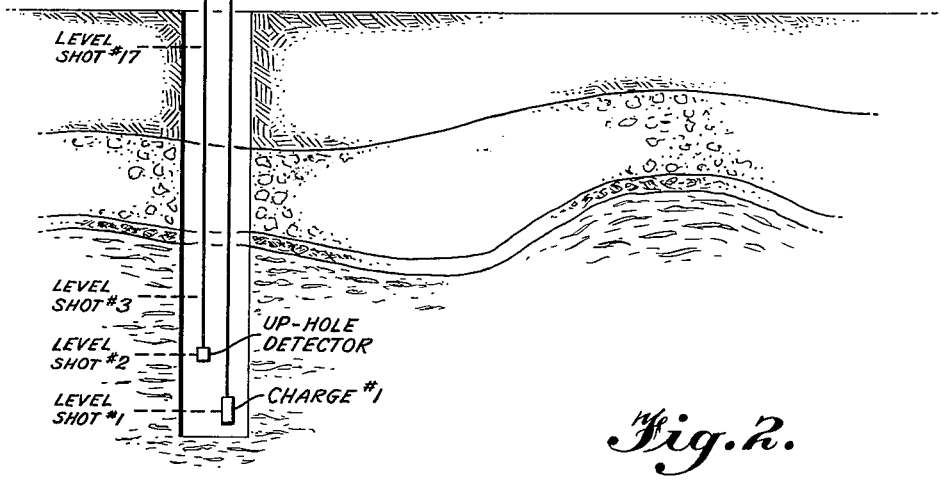
Fig. 2.
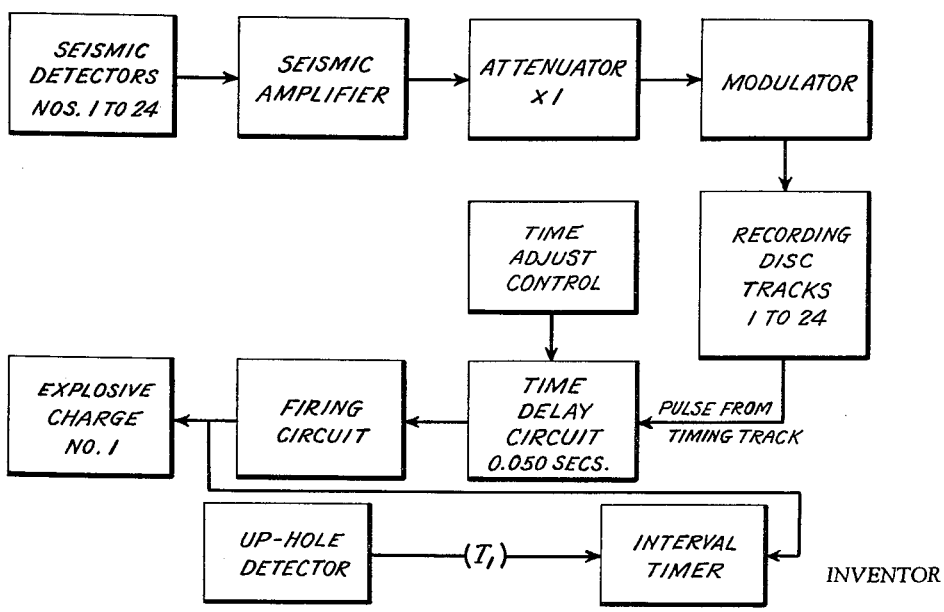
INVENTOR
*John A. F. Gerrard*
BY *Stevens, Davis, Miller & Mosher*
ATTORNEYS

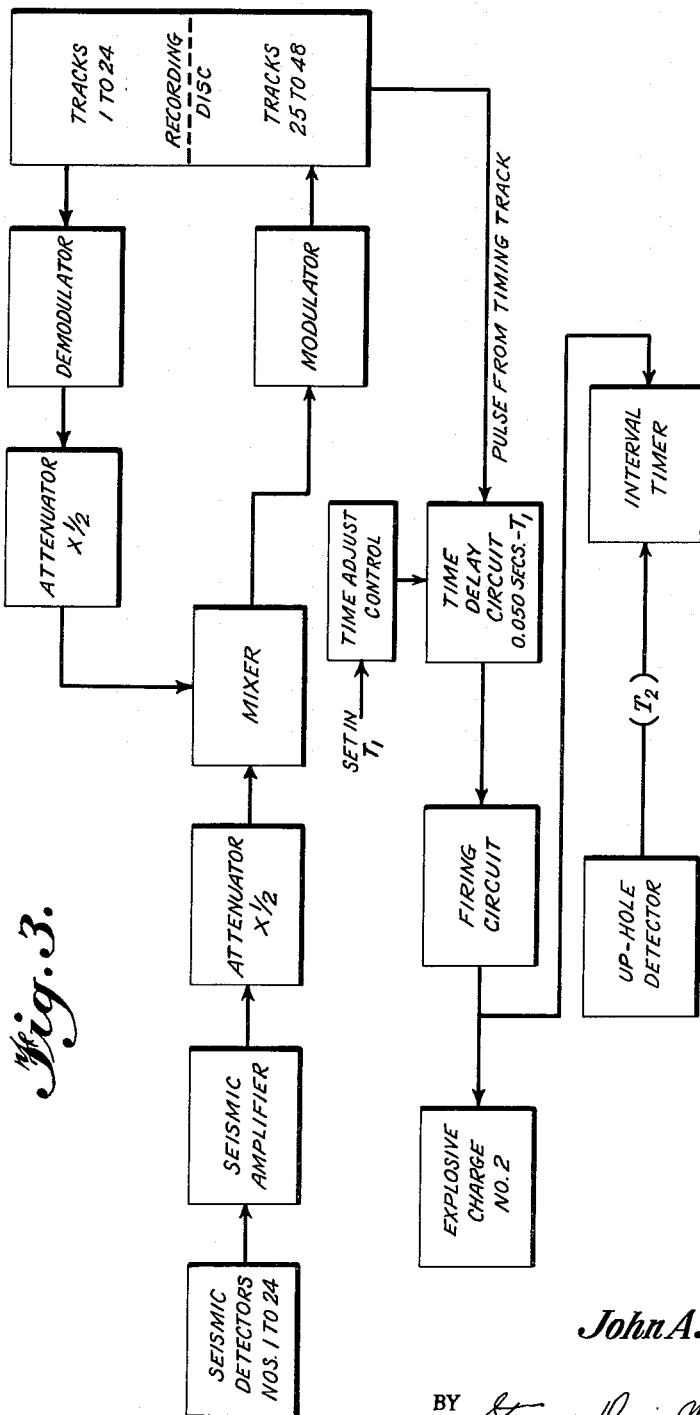

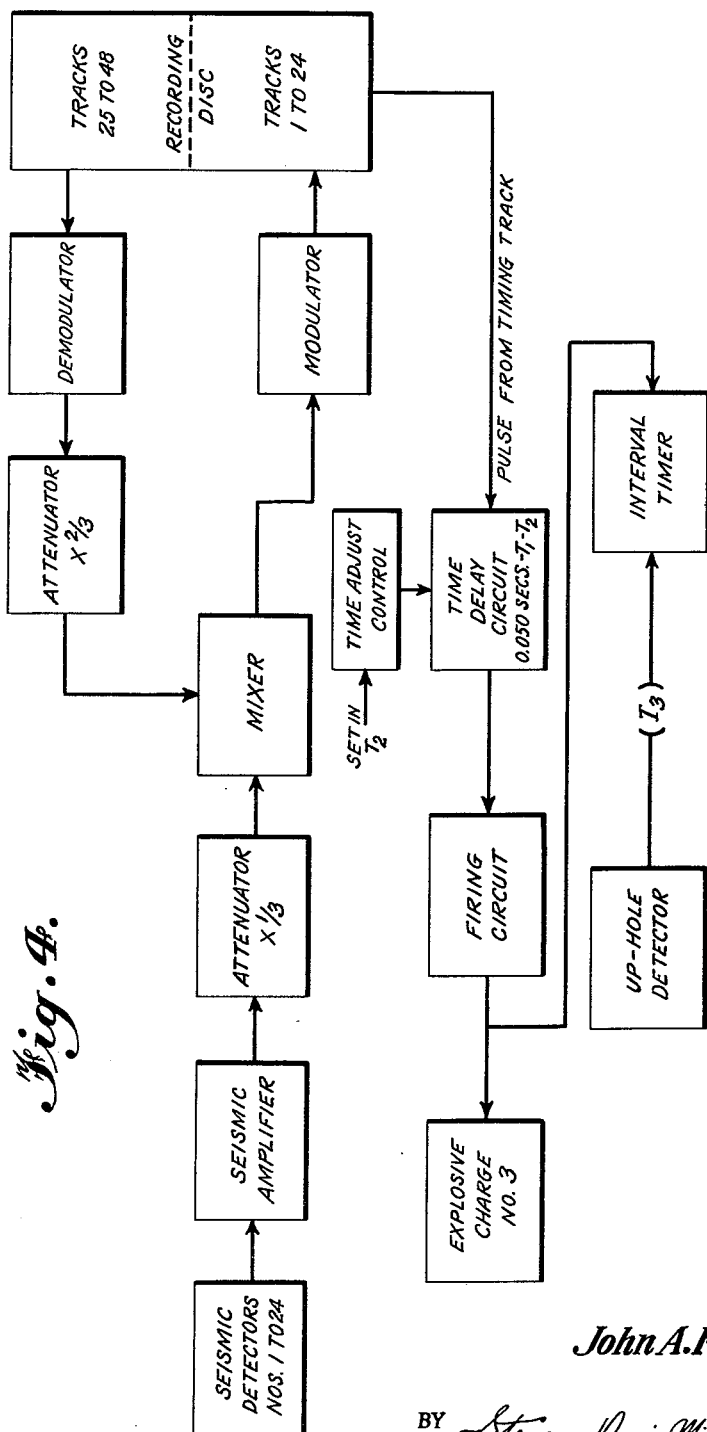

United States Patent Office 3,054,473
Patented Sept. 18, 1962

3,054,473
SYSTEM FOR RECORDING DATA FOR USE
IN SEISMIC SURVEY
John A. F. Gerrard, Dallas, Tex., assignor to Texas Instruments Incorporated, Dallas, Tex., a corporation of Delaware
Filed Dec. 27, 1957, Ser. No. 705,604
3 Claims. (Cl. 181—.5)

This invention relates to a method and apparatus for compiling seismic data.

The present invention relates to a system for use in recording, with a multitrack recording means, the combined results of a plurality of shots which are detonated individually and separately in the same shot hole at different depths. Because of economic consideration and also because of desired simplicity of operation, the original data from each individual shot is not preserved as such. However, the combined total data from all shots is stored permanently on the recording member for immediate or future playbacks to a paper seismogram.

Purely for the purposes of illustration, and not by way of limitation, the system of the present invention employs 24 seismic detectors located in 24 different positions relative to the shot hole. Also, and purely by way of illustration, the present invention contemplates employing 17 separate shots at 17 different elevations in the shot hole. Preferably, the recorder used in the practice of the present invention is of the multichannel magnetic type, but it is to be understood that other suitable types of recorders may be used.

Therefore, it is a principal object of this invention to provide a system for combining, through a recording device, the records of a plurality of shots for the purpose of producing a final composite record of which the significant seismic signals are rendered more prominent and, thus, more easily distinguished and interpreted, through the suppression of undesirable signals which ordinarily obscure many of these significant signals.

Other and further objects and advantageous features of the present invention will hereinafter more fully appear from a detailed description of the system as depicted in the drawings, in which:

FIG. 1 is a semi-diagrammatic view of the shot hole, the associated firing circuit, and the interval timing circuit;

FIG. 2 is a block diagram of the circuit components employed for firing the first explosive charge or shot and recording the data resulting therefrom;

FIG. 3 is a block diagram of the circuit components employed for the firing of and recording data resulting from the second shot; and FIG. 4 is a block diagram of the circuit components employed for the firing and recording of the third shot.

The recording member to be employed with the present invention, as indicated diagrammatically in the various figures of the drawings, is one in which there are 48 separate recording tracks (or traces) for the recording of seismic data. In addition to the recording tracks, there is also provided a timing track or pulse track which is used to maintain the proper time phase relation between the information signals supplied to and taken from the various recording tracks.

As shown in FIG. 1, a first explosive charge indicated as "Charge No. 1" is placed at the lowest level in the shot hole as designated by "Level Shot No. 1." The various other levels indicated for shots Nos. 2, 3, etc. up to and including shot No. 17 represent the locations of the successive charges to be detonated in the shot hole as will be more fully described later. The uphole detector illustrated in FIG. 1 is placed in the location at which the next successive explosice charge is to be fired so as to determine the time required for the transmission of sound energy from the location of the instant charge to that of the next successive charge. A number of detectors or seismometers (not shown) are placed on the surface in any pattern or manner known in the art as dictated by the physical characteristics of the area and by the experience and judgment of those conducting the seismic survey. The various units of the recording system, all of which comprise circuits well known in the art, are interconnected as shown partially in FIGS. 1 and 2 and completely in FIGS. 3 and 4. Because certain of the units of the complete recording system used in the practice of the present invention are not used for the timing and firing of the first shot and the recording of the first set of data, these units are not shown in the diagram of FIGS. 1 and 2. However, a complete system for the practice of the present invention showing all these various units used is diagrammed in FIGS. 3 and 4.

For the first shot, the recorder is turned on and the recording medium, on the timing track of which there has been previously recorded a single timing pulse, is set in motion. This previously recorded timing pulse is used to initiate the firing circuit for this and subsequent shots in order that the received seismic signals will be recorded on the recording medium in a definite and accurately known time phase relationship with respect to the timing pulse and consequently with respect to the signals from each of the other shots, even though the shots are actually fired in a much different time relation. The timing pulse actuates the firing circuit after having been first passed through a time delay circuit which has been preset to some fixed delay. A fixed delay of 0.050 second will be used for the present illustration. Thus, the firing circuit will be energized and the first charge detonated at precisely 0.050 second after the recorded timing pulse passes under the timing track detector head of the recorder. After this fixed time delay, the firing circuit is energized and the first charge is detonated. The output signal of the firing circuit, in addition to detonating the charge, also actuates the interval timer. The interval timer will indicate the time elapsed beween the detonation of the charge and the arrival of the first energy from the shot at the up-hole detector which as noted previously, is located in the shot hole at the point where the second shot charge is to be detonated. Thus, the interval timer will indicate the time required for the transmission of sound energy from the level of charge No. 1 to the level of charge No. 2. This difference will be designated as $T_n$ where "n" represents generically the number of the shot from which this time "T" was obtained. Thus far the first shot $T_n$ is $T_1$ as shown in FIG. 2. Following the detonation of the explosive charge No. 1, the direct traveling seismic waves and the seismic waves reflected from the various formations below the surface are detected by the seismic detectors Nos. 1 to 24 (see FIG. 2) which transmit their information through the seismic amplifier, the attenuator (with no attenuation), and the modulator to the recorder to be recorded on tracks Nos. 1 to 24, respectively. At the same time, the interval timer has received the information from the up-hole detector regarding the time lapse, $T_1$.

After slightly less than one revolution of the recording medium, which will provide sufficient recording time to record all of the useful information from one shot, the recorder is stopped, either by manual or automatic switching, to allow for preparation of the next shot. Preparation for the next shot comprises placing a charge at shot level No. 2, moving the up-hole detector to shot level No. 3, switching the recorder functions as illustrated and explained in connection with the following discussion of FIG. 3, adjusting the attenuator for proper signal attenuation as described later, and resetting the time delay circuit.

The time delay circuit is reset for each shot by setting into the time adjust control the factor $T_{n-1}$ where "$n$" represents generically the number of the shot next to be fired. Thus, for the second shot, $T_{n-1}$ is equal to $T_1$ and for the third shot $T_{n-1}$ is equal to $T_2$. "$T_n$," then, for any particular shot becomes "$T_{n-1}$" for the next shot. Each $T_{n-1}$ set into the time adjust control circuit is added by the time adjust control circuit to those previously set in for the particular series of shots. The time adjust control circuit controls the time delay circuit causing it to provide a signal delay of 0.050 second minus $(T_1 + T_2 + \ldots T_{n-1})$. Where the interval timer is provided with a visual readout only, the time indicated must be set into the time adjust control manually. However, an electrical output indicating $T_n$ may be provided for direct connection to the time adjust control thus automatically setting in to the circuit the proper delay for the next shot. With $T_1$ set into the time adjust control, the time delay circuit will provide a time delay of 0.050 second minus $T_1$ and thus allow the firing circuit to be actuated, and the second shot fired, earlier after the detection of the pulse from the pulse track than was the first shot by an amount of time represented as $T_1$ seconds.

FIG. 3 illustrates the interconnection of the various units for the firing of shot No. 2. In the diagram of FIG. 3, the recorder has been switched so that tracks Nos. 1 to 24, inclusive, on which signals from the first shot were recorded, are reproducing those signals while tracks 25 to 48, inclusive, are recording another set of signals. With the system thus connected, shot No. 2 is fired in the same manner as was shot No. 1, that is, by turning on the recorder. The pulse from the timing track is again detected and fed through the time delay circuit in which the delay is now 0.050 second minus $T_1$. After this delay, the pulse passes to the interval timer and to the firing circuit detonating explosive charge No. 2. The up-hole detector (now located at the level of shot No. 3) is actuated by the explosion and sends a signal to the interval timer which will indicate the time $T_2$ representing the time required for the transmission of energy from the level of charge No. 2 to the level of charge No. 3. Subsequent to the detonation of explosive charge No. 2, information from the seismic detector is transmitted through the seismic amplifier and the attenuator, wherein the signals are attenuated to one-half their original amplitude, to a mixer stage. At the same time, the energy from the first shot which had previously been recorded on disc tracks 1 to 24 is reproduced from these tracks and passed through a demodulator and an attenuator, where it is attenuated to one-half of its original amplitude. These No. 1 shot signals are then fed into a second input of the mixer stage. The combined energy properly apportioned from the first and second shots is then transmitted from the mixer to the modulator and is recorded on disc tracks 25 to 48.

FIG. 4 represents the firing and recording of the seismic data from the detonation of explosive charge No. 3. In this instance, the recorder has been again switched so that disc tracks 25 to 48, inclusive, are reproducing while disc tracks 1 to 24 are again recording. The pulse from the timing track passes into the time delay circuit, where it is now delayed, because of a further adjustment of the time delay circuit after the second shot, for a period of time equal to the standard setting of 0.050 second minus the sum of $T_1$ and $T_2$. The pulse passes from the time delay circuit into the firing circuit and charge No. 3 is detonated. Seismic information from the detonation of charge No. 3 is transmitted from the seismic detectors 1 to 24 through the seismic amplifier, the attenuator where it is attenuaed to one-third of its amplitude and then to the mixer stage. In the meantime, the combined energy from shots Nos. 1 and 2, as previously recorded on disc tracks 25 to 48, inclusive, is transmitted back to the demodulator, through the attenuator where it is attenuated to two-thirds of its original amplitude, and from there into the mixer. The combined energy of shots Nos. 1, 2 and 3 passes from the mixer, through the modulator, and on to the disc tracks 1 to 24, inclusive. It should be noted that for each shot, the attenuators are so adjusted that the signals from each shot contribute equally to the composite signal. For example, the third set of signals recorded is a combination of the signals from shot No. 3 at one-third of their original strength and the signals from shots Nos. 1 and 2 each at two-thirds of one-half, or one-third of their original strength.

Simultaneously with the transmission of energy from the seismic detectors, the up-hole detector has transmitted the information $T_3$ to the interval timer for use in setting up the apparatus for the next detonation.

The remaining explosive charges 4 to 17 are handled in a similar fashion. For example, for the firing and recording of shot 4, the explosive charge is placed in the shot hole at the predetermined level. The up-hole detector is then located at the level of shot 5. The recorder is switched so that tracks 1 to 24, inclusive, are reproducing and tracks 25 to 48, inclusive, are recording. The time delay circuit is adjusted to provide a time delay of 0.050 second minus the sum of ($T_1$ plus $T_2$ plus $T_3$). The pulse from the timing track, delayed as indicated above, causes detonation of charge No. 4. Prior to recording, the energy resulting from the detonation of charge No. 4 is attenuated to one-fourth of its amplitude. The energy from combined shots 1, 2 and 3 is attenuated to three-fourths of its amplitude. The combined energy from shots 1, 2, 3 and 4, as attenuated in the above manner is mixed and then recorded on disc tracks 25 to 48, inclusive. The up-hole detector and interval timer mark the time $T_4$ which is to be set into the time adjust control where it will add to the other times $T_1$, $T_2$, and $T_3$ to determine the firing delay for the detonation of the fifth charge.

The fifth through the seventeenth explosive charges are handled in a similar fashion. On each detonation, the firing delay will be further reduced by an amount equal to the up-hole time obtained from the prior detonation. As shown in the system of the instant invention, when recording has been completed the combined results of the seventeen explosive charges will be recorded on disc tracks 1 to 24, inclusive; the information on disc tracks 25 to 48 will represent the combined information for the first sixteen detonations. Therefore, there will always be two sets of data available. One set of data, as represented by the information recorded on disc tracks 1 to 24, will indicate the complete results of all the detonations; the information recorded on the remaining disc tracks 25 to 48 will indicate all of the available information except for that of the last detonation.

At this point, it is believed that a better understanding of the present invention may be had through an explanation of the effect of the described method of combining signals on the final form usually employed to display seismic data for interpretation, i.e., a visual oscillographic record or seismogram.

As is well known to those skilled in the art, the signals usually considered of prime importance in the interpretation of a seismogram are those signals from waves reflected directly from various strata or geological formations below the level of the shot point. However, recognition and interpretation of these signals from directly reflected waves becomes quite difficult when the record also contains noise, signals from direct traveling waves, signals from refracted waves, and signals from multiple reflection waves, that is, waves reflected first from the surface or the strata above the shot point and then from the formations below the shot point. The above described technique for recording and combining seismic signals is for the purpose, and has the effect, of making the desired signals from directly reflected waves more distinguishable from undesirable waves and more easily interpreted on the final seismogram.

It will be remembered that the various shots are fired at various times, but, as recorded, the signals from each shot bear a different but definite and fixed relationship to a fixed point on the record representing zero time. This point is the occurrence of the timing pulse on the timing track. Thus, as recorded, the shot fired at level No. 2 is fired earlier, with respect to zero time on the record, than is the shot fired at level No. 1 by an amount of time equal to the time required for the seismic wave generated to travel between the two shot levels. In this way, the directly reflected wave signals are caused to appear in phase, as recorded, and, when combined, to reinforce each other. However, undesirable signals such as those from direct traveling and indirectly reflected waves, both of which travel a shorter distance from the second shot point, together with signals from refracted waves are recorded out of phase, partially because of the changes in travel times of the waves, and partly because of the change of time with respect to zero time of the record at which the second shot is fired. Thus, when combined, the undesirable signals from the first and second shots tend to obscure or cancel each other. When these effects are multiplied by combining signals from, say, seventeen shots, as in the example, the desired directly reflected wave signals become quite recognizable on the seismogram and the undesirable wave signals appear as no more than low level noise.

Whereas the instant invention has been described with particular reference to the figures of the drawings contained herein, it should be apparent that other and further modifications of the instant invention, apart from those shown or suggested herein, might be made within the spirit of this invention. The present invention therefore is to be limited only as set forth in the appended claims.

What is claimed is:

1. An apparatus for detecting and recording seismic data by detonating a plurality of explosive charges within a shot hole in the earth, each of said charges being at a different level in said shot hole, comprising, means to generate timing signals, means responsive to a first one of said timing signals for detonating a first explosive charge at a predetermined height within the shot hole at a predetermined time after the generation of said first timing signal, means located at the level of a second one of said explosive charges for detecting the energy resulting from the detonation of said first explosive charge, means operatively associated with said detecting means for measuring the time interval for the transmission of the energy from the location of said first explosive charge to the location of said detecting means at the level of said second explosive charge, seismic detector means responsive to said detonation for detecting seismic waves, means operatively associated with said seismic detectors for recording at a predetermined intensity level the detected signals from the detonation of said first explosive charge, means responsive to a second one of said timing signals for detonating said second explosive charge at said next level in said shot hole at a preselected time after said second timing signal, said preselected time being equal to said predetermined time minus said measured time interval, means operatively associated with said means for detecting the energy resulting from the detonation of said first explosive charge to position said means at the level of a third explosive charge for detecting energy resulting from the detonation of said second explosive charge, said detecting means being operatively associated with said means for measuring said time interval for measuring the time interval for the transmission of energy from the location of said second explosive charge to the location of said third explosive charge to be detonated, means operatively associated with said seismic detectors for attenuating by a predetermined amount the signals received as a result of said second detonation, means operatively associated with said recording means for attenuating said recorded detected signals resulting from the detonation of said first explosive charge by a predetermined amount, means associated with both said attenuating means for combining the attenuated signals resulting from the detonation of said first and second explosive charges and means operatively associated with said combining means for recording the combined signal.

2. An apparatus for detecting and recording seismic data by detonating a plurality of explosive charges within a shot hole in the earth, each of said charges being at a different level in said shot hole, comprising, means to generate timing signals, means responsive to a first one of said timing signals for detonating a first explosive charge at a predetermined height within the shot hole at a predetermined time after generation of said first timing signal, means located at the level of a second one of said explosive charges for detecting the energy resulting from the detonation of said first explosive charge, means operatively associated with said detecting means for measuring the time interval for transmission of the energy from the location of said first explosive charge to the location of said detecting means at the level of said second explosive charge, seismic detector means responsive to said detonation for detecting seismic waves, means operatively associated with said seismic detectors for recording at a predetermined intensity level the detected signals from the detonation of said first explosive charge, means responsive to a second one of said timing signals for detonating said second explosive charge at said next level in said shot hole at a preselected time after said second timing signal, said preselected time being equal to said predetermined time minus said measured time interval, means operatively associated with said means for detecting the energy resulting from the detonation of said first explosive charge to position said means at the level of a third explosive charge for detecting energy resulting from the detonation of said second explosive charge, said detecting means being operatively associated with said means for measuring said time interval for measuring the time interval for the transmission of energy from the location of said second explosive charge to the location of said third successive explosive charge to be detonated, means operatively associated with said seismic detectors for attenuating by one-half the signals received as a result of said second detonation, means operatively associated with said recording means for attenuating by one-half said recorded detected signals resulting from the detonation of said first explosive charge, means operatively associated with both said attenuating means for combining the attenuated signals resulting from the detonation of said first and second explosive charges, and means operatively associated with said combining means for recording the combined signal.

3. An apparatus as set forth in claim 1, wherein said means for attenuating by a predetermined amount attenuates each of the signals received therein by an amount equal to one minus the reciprocal of the number of preceding detonations and said means for attenuating said recorded signals attenuates each of the signals received therein by an amount equal to one minus the value of the instant attenuation.

References Cited in the file of this patent

UNITED STATES PATENTS

| | | |
|---|---|---|
| 2,021,943 | McCollum | Nov. 26, 1935 |
| 2,137,985 | Salvatori | Nov. 22, 1938 |
| 2,376,195 | Scherbatskoy | May 15, 1945 |
| 2,771,960 | Smith | Nov. 27, 1956 |
| 2,806,545 | Schempf | Sept. 17, 1957 |
| 2,882,988 | Dobrin | Apr. 21, 1959 |